F. O. PAIGE.
MEANS FOR TREATING BOILER FEED WATER.
APPLICATION FILED APR. 12, 1915.
1,188,676.
Patented June 27, 1916.
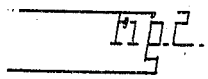
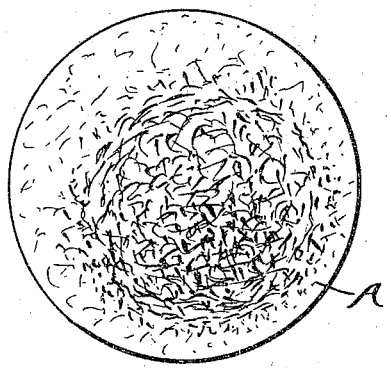
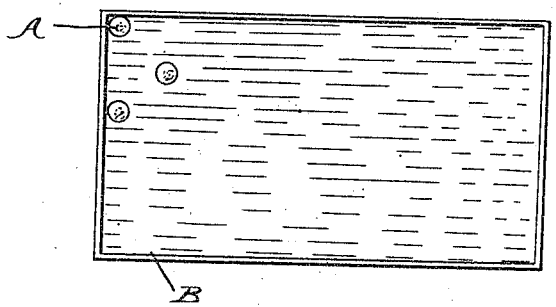
Witnesses
Inventor
Frederick O. Paige.
By Whittemore, Hulbert & Whittemore
Attorneys

UNITED STATES PATENT OFFICE.

FREDERICK O. PAIGE, OF NEW YORK, N. Y., ASSIGNOR TO PAIGE & JONES CHEMICAL COMPANY, OF NEW YORK, N. Y., A CORPORATION OF NEW YORK.

MEANS FOR TREATING BOILER FEED-WATER.

1,188,676.  Specification of Letters Patent. Patented June 27, 1916.

Application filed April 12, 1915. Serial No. 20,859.

*To all whom it may concern:*

Be it known that I, FREDERICK O. PAIGE, a citizen of the United States of America, residing at New York, in the county of New York and State of New York, have invented certain new and useful Improvements in Means for Treating Boiler Feed-Water, of which the following is a specification, reference being had therein to the accompanying drawings.

The invention relates to the treatment of boiler feed water to prevent the formation of scale and has particular reference to the treatment of the feed water of locomotives.

It is the object of the invention to accurately regulate the quantity of material which is introduced with the feed water from the tender, and to this end the invention comprises the novel means employed for facilitating the uniform and slow dissolution of the compound.

More specifically the invention comprises a slowly disintegrable body, which is of a substantially spherical form, so that when placed in the tender tank the mechanical agitation due to the movement of the locomotive will cause a uniform disintegration.

In the drawings: Figure 1 is an elevation of a pellet of my improved construction; and Fig. 2 is a diagrammatic plan view of the water tank in the tender showing the pellets therein.

My improvement comprises, first, a suitable compound or mixture for preventing the formation of the scale when introduced in the boiler, such for instance as one containing a quantity of graphite, soda and other ingredients that have been found to be useful for this purpose. A further essential is the incorporation with the compound or mixture of a binding material such as dextrin which temporarily holds the same in solid form, and which gradually liberates the compound by the dissolution of the binder. Thus by choosing a slowly soluble binder the active material may be liberated at just the proper rate to correspond to the quantity of water fed. There is, however, the danger that if the pellet remains in fixed position the loosened material may not be displaced to be carried into the water current.

To overcome the difficulty just referred to, and to produce a uniform dissolution and feeding of the compound into the water current I impart to the pellet A a substantially spherical form, so that it is permitted to roll about in all directions within the tank. This movement will be caused by the combined effect of the inertia of the pellet and the oscillations of the moving locomotive, with a result that the softened surface of the pellet will be rubbed off at a uniform rate, and the spherical form will be maintained until complete disintegration takes place.

While I have described the form of the pellet as spherical, it is not absolutely essential that it should be that of a true or perfect sphere. It is, however, desirable that the pellet should be capable of rolling in all directions, as otherwise it might become lodged in a corner of the tank B and held from further movement.

What I claim as my invention is:—

The method of uniformly impregnating boiler feed water with a boiler compound consisting in combining the compound with a binder gradually disintegrable in water at ordinary temperature, forming thereof a universally rollable solid body, and introducing said body into the feed water tank of a locomotive boiler where it will be subject to the oscillation of the moving vehicle and thereby caused to roll about to facilitate uniform and gradual disintegration.

In testimony whereof I affix my signature in presence of two witnesses.

FREDERICK O. PAIGE.

Witnesses:
EMMA G. GOLDBERGH,
CELESTE WENZEL.